(12) United States Patent
Bohan (10) Patent No.: US 6,996,816 B1
(45) Date of Patent: Feb. 7, 2006

(54) UTILIZATION OF THIRD PARTY LEGACY DATA LIST

(75) Inventor: David Bohan, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

(21) Appl. No.: 09/676,078

(22) Filed: Oct. 2, 2000

(51) Int. Cl.
G06F 9/44 (2006.01)
G06F 3/00 (2006.01)

(52) U.S. Cl. .................... 717/169; 717/168; 717/170; 717/172; 719/328; 719/329

(58) Field of Classification Search ............... 717/168, 717/169, 170, 171, 172, 173; 709/328, 329; 719/328, 329
See application file for complete search history.

(56) References Cited

U.S. PATENT DOCUMENTS

| | | | | |
|---|---|---|---|---|
| 5,619,716 A | * | 4/1997 | Nonaka et al. | 717/170 |
| 5,666,501 A | * | 9/1997 | Jones et al. | 717/177 |
| 5,857,073 A | * | 1/1999 | Tsukamoto et al. | 709/208 |
| 5,933,646 A | * | 8/1999 | Hendrickson et al. | 717/169 |
| 5,949,998 A | * | 9/1999 | Fowlow et al. | 717/105 |
| 5,974,474 A | * | 10/1999 | Furner et al. | 710/8 |
| 6,006,034 A | * | 12/1999 | Heath et al. | 717/170 |
| 6,134,548 A | * | 10/2000 | Gottsman et al. | 709/217 |
| 6,151,702 A | * | 11/2000 | Overturf et al. | 717/136 |
| 6,266,774 B1 | * | 7/2001 | Sampath et al. | 709/219 |
| 6,356,905 B1 | * | 3/2002 | Gershman et al. | 709/219 |
| 6,359,892 B1 | * | 3/2002 | Szlam | 709/217 |
| 6,442,754 B1 | * | 8/2002 | Curtis | 717/175 |
| 6,571,282 B1 | * | 5/2003 | Bowman-Amuah | 709/219 |

OTHER PUBLICATIONS

"Web390 for OS/390 and MVS", Information Builders, Inc., 1999. (online) http://www.informationbuilders.com/products/web390/pdf/web390.pdf.*
"Information Builders Brings the Mainframe To the Internet/Intranet", IT Update, Sep. 10, 1996, vol. 2, Nr. 37, p. 1-5.*
"Web390: Secure S/390 Meets the Web", Information Builders, Inc., (online) http://www.informationbuilders.com/products/web390/.*
"Web390 for VM", Information Builders, Inc., 1999 (online) http://www.informationbuilders.com/products/web390/pdf/webvm.pdf.*
"The Best Kept Secrets About e-business on VM", IBM, 1999, p. 1-9.*
S. E. Varney, "Datawebs! Link the Web to Your Legacy Data and Apps", Datamation, Apr. 1, 1996, vol. 42, No. 7, p. 38-47.*
P. Mittelman, "Web FOCUS for the IBM mainframe", 1996, Information Builders, p. 1-4.*

* cited by examiner

*Primary Examiner*—Wei Y. Zhen
*Assistant Examiner*—Qamrun Nahar (57) ABSTRACT

An application program is provided access to a third party legacy data list not supported by the application program. A method embodiment includes supplying a plug-in module capable of providing an interface between the application program and the third party legacy data list. The application program sends a function call to the plug-in module. The plug-in module, in response to the function call, accesses the third party legacy data list and provides the application program information relating to the third party legacy data list.

24 Claims, 6 Drawing Sheets

UTILIZATION OF THIRD PARTY LEGACY DATA LIST

FIELD OF THE INVENTION

This invention relates generally to computer software, and more particularly to methods of allow use of legacy data lists by a newly installed application program.

BACKGROUND OF THE INVENTION

Data lists are used extensively in various application programs. For example, a phonebook is typically a requirement for computer facsimile software. As another example, e-mail address books and contact information lists are commonly incorporated into e-mail programs. Typically, the data list is maintained in a custom format for its particular application program, and not compatible with other application programs.

When a new application program is installed to replace an existing, or a legacy, application program, a new user must populate the data list associated with the new application program. Such population can be done manually or semi-automatically by use of an import function. In the latter case, a phonebook or address book, for example, from the legacy data list from the legacy application program is imported into the new application problem. A problem with either of the above technique is that two separate data lists must be maintained and synchronized. This requires extra and duplicated effort on the part of the user, and is thus undesirable.

Thus, there is a need for a method and apparatus for allowing a new application program to utilize data lists of one or more legacy application program without requiring a user to maintain and/or synchronize two separate data lists.

SUMMARY OF THE INVENTION

In accordance with the principles of the present invention, a method of providing an access to one or more third party legacy data list to a user of an application program of a computer system comprises querying an operating system, by the application program upon start of the application program, whether one or more plug-in module is registered in a registry of an operating system, the one or more plug-in modules being capable of interfacing with corresponding respective ones of the one or more third party legacy data list, receiving, from the one or more plug-in modules found in the registry, identifications of ones of the one or more third party legacy data list corresponding to the found one or more plug-in modules, and providing a list of the identifications to the user through a user interface of the application program.

In accordance with another aspect of the present invention, a system for providing an access to one or more third party legacy data list to a user of a computer system comprises one or more plug-in module, each of which being capable of interfacing with an associated one of the one or more third party data list, each of the one or more plug-in modules being registered in a registry of an operating system of the computer system, and an application program having a user interface, the application program upon starting being in communication with the operating system to query the registry to determine registered ones of the one or more plug-in module, the application program further configured to query each of the registered ones of the one or more plug-in modules for names of the one or more third party legacy data list, the application program being configured to provide a list of the names of the one or more third party legacy data list to the user through the user interface.

In accordance with yet another aspect of the present invention, a computer readable storage medium on which is embedded one or more computer programs, the one or more computer programs implementing a method of providing an access to one or more third party legacy data list to a user of an application program of a computer system, the one or more computer programs comprises a set of instructions for querying an operating system, by the application program upon start of the application program, whether one or more plug-in module is registered in a registry of an operating system, the one or more plug-in modules being capable of interfacing with corresponding respective ones of the one or more third party legacy data list, receiving, from the one or more plug-in modules found in the registry, identifications of ones of the one or more third party legacy data list corresponding to the found one or more plug-in modules, and providing a list of the identifications to the user through a user interface of the application program.

In comparison to known prior art, certain embodiments of the invention are capable of achieving certain advantages, including some or all of the following: (1) saving time and effort of the user; (2) eliminating the need for a user to populate a new data list; (3) eliminating the need to maintain and synchronize multiple data lists; (4) avoiding errors that can be introduced during the population process; and (5) eliminating the need for a user to learn a new user interface. Those skilled in the art will appreciate these and other advantages and benefits of various embodiments of the invention upon reading the following detailed description of a preferred embodiment with reference to the below-listed drawings.

BRIEF DESCRIPTION OF THE DRAWINGS

Features and advantages of the present invention will become apparent to those skilled in the art from the following description with reference to the drawings, in which.

DETAILED DESCRIPTION OF A PREFERRED EMBODIMENT

For simplicity and illustrative purposes, the principles of the present invention are described by referring mainly to an exemplar embodiment thereof, particularly with references to an example of a facsimile software. However, one of ordinary skill in the art would readily recognize that the same principles are equally applicable to, and can be implemented in, any device configuration setting of any other types of application programs that utilizes a data list, and that any such variation would be within such modifications that do not depart from the true spirit and scope of the present invention.

In accordance with the principles of the present invention, a method and system of a computer application program allows a user of the application program to utilize third party legacy data lists, e.g., contact information lists, telephone and facsimile numbers, scheduling and/or appointment information or the like, through a common interface, without requiring the user to manually type in the data into a new data list or to maintain multiple data lists. For each of the third party legacy data list installed on the computer, one of a plurality of plug-in modules also installed on the computer acts as an interface between the application program and the legacy data list. Each of the plug-in module is an object accessible by the application program at run-time.

In one embodiment, the plug-in modules are compiled as a dynamic linked library (DLL) and registered in the operating system registry based on an object oriented specification, e.g., the component object model (COM) specification provided by the Microsoft Corporation of Redmond, Wash., USA. The plug-in modules are listed under a COM category in the registry of the operating system, and are discovered by the application program at start up. Additional plug-in modules may be added at any time simply by registering the additional plug-in modules. The next time the application program is started, the additional plug-in modules are automatically discovered. Using the discovered plug-in modules, the application program allows the user to access and/or edit the third party legacy data lists through the user interface of the application program. In an alternative embodiment, upon an indication, by the user of the application program, a desire to edit data of a particular third party legacy date list, the corresponding plug-in module causes the editor user interface screen of the legacy data list to be displayed to the user. The user is allowed to edit the data list using the user interface of the legacy data list.

Figure 1:
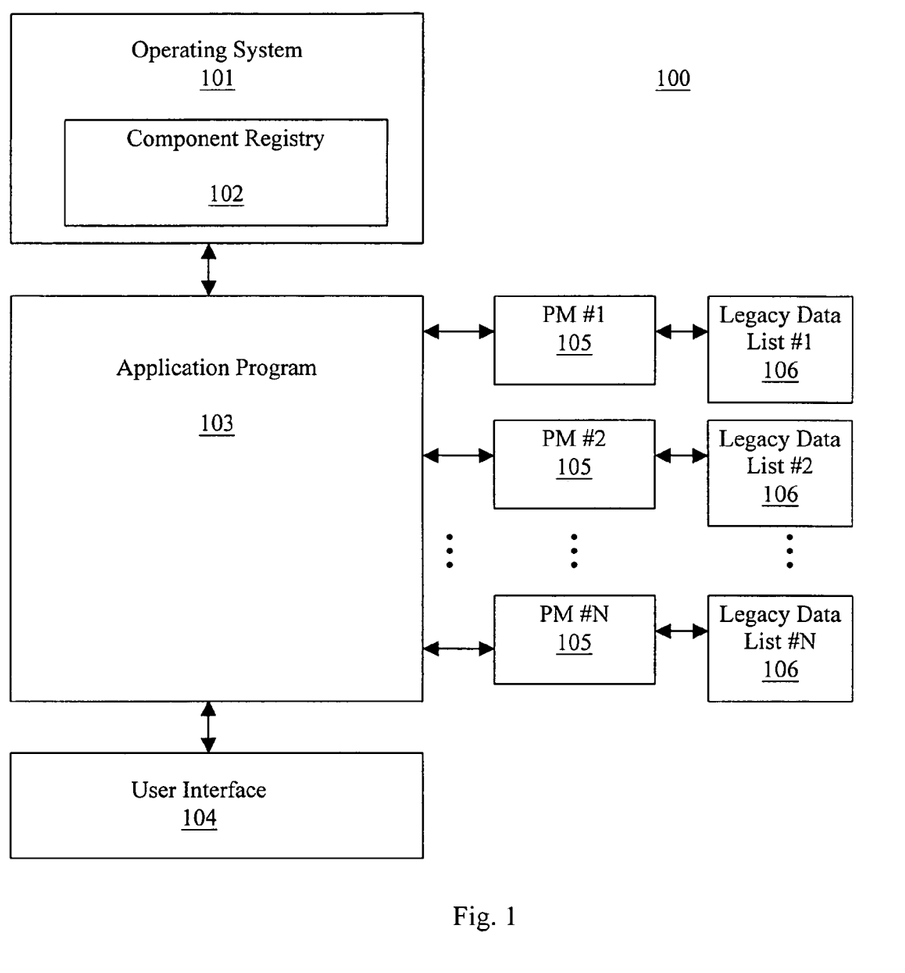
FIG. 1 shows an exemplary embodiment of the relevant portions of a system for providing user access of third party legacy data list in accordance with the principles of the present invention.

In particular, FIG. 1 shows an exemplary embodiment of the relevant portions of a system 100 for providing user access of third party legacy data list in accordance with the principles of the present invention. The system 100 comprises an operating system (OS) 101 installed on the computer (not shown). The OS 101 may be, for example, the WINDOWS™ sold by the Microsoft Corporation of Redmond, Wash., USA. The operating system includes a component registry 102 that keeps a list of system components and resources required by an application program 103 installed on the computer. The application program 103 may comprise any program that is require to or is desirable to keep a data list. For example, a facsimile software may keep a list of names and facsimile telephone numbers of many potential recipients. An e-mail software may need to keep a list of e-mail addresses of various e-mail users. Many personal organizer programs keep contact information, scheduling/appointment lists, or the like.

The application program 103 may also comprise a user interface 104 for providing a user of the application program means for interact with the application program 103. In accordance with the principles of the present invention, the user interface 104 serves as a common interface through which the user may access any number of third party legacy data lists 106, i.e., the legacy data list #1 through legacy data list #N (where N may be any integer greater than equal to 1) installed on the computer.

Figure 1A:
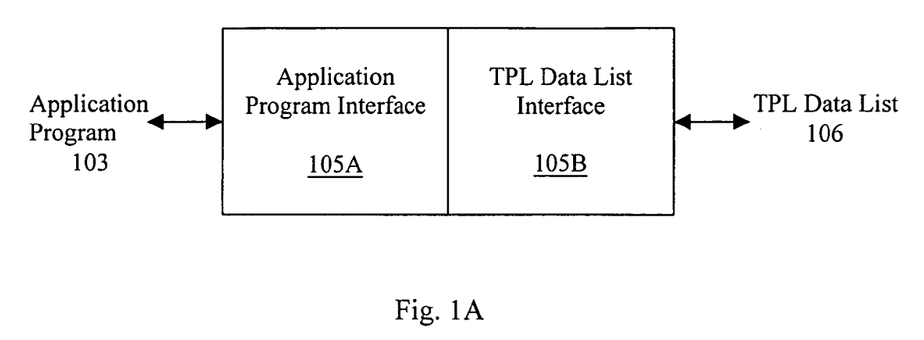
FIG. 1A shows a more detailed depiction of an exemplary embodiment of one of the plug-in module shown in FIG. 1.

The system 100 may also comprise any number of plug-in modules (PM) 105, one of which is shown in more detail in FIG. 1A. As shown, each plug-in module 105 comprises an application program interface portion 105A and a third party legacy (TPL) data list interface portion 105B. The application program interface portions 105A of all plug-in modules are identical to each other. Thus, the application program 103 may use one common protocol and/or function call set to communicate with all plug-in modules 105. Thus, when an additional plug-in module is installed on the computer after the installation of the application program 103, the application program 103 need not be recompiled or modified in any way. As will described in more detail later, the newly added plug-in modules are discovered by the application program 103, and are used by the application in the same manner that the existing plug-in modules are used.

In accordance with an embodiment of the present invention, each of the plug-in modules 105 is compiled as a dynamic link library, with which the application program 103 may communicate during run-time. In a preferred embodiment of the present invention, the application program 103 and each of the plug-in modules 105 are made to be in compliance with the component object model (COM) specification included in the WINDOWS™ operating system sold by the Microsoft Corporation of Redmond, Wash., USA.

Referring again to FIG. 1A, the TPL data list interface portion 105B of each of the plug-in modules is developed specifically for the third party legacy data list the particular plug-in module is intended to support. The information, e.g., the function call sets, necessary to interface to and to access a third party legacy data list is obtained from the information typically published by the supplier of the data list.

Each of the plug-in modules perform any number of the following tasks: 1) return the name of the particular data list it supports (or the name of the legacy application program from which the particular data list was created) in response to a name request function call from the application program; 2) determine whether the data list it supports is installed on the computer in response to an availability check function call from the application program; 3) display a editor user interface (of either the application program 103 or the legacy data list 106), through which a user can add, delete or modify any datum of the particular data list it supports in response to a edit request function call from the application program; 4) allow creation of a distribution (or recipient) list in response to a group creation function call from the application program; and 5) provide the data set, e.g., the list of telephone numbers, for access by a user, in response to a data request function call from the application program.

Figure 2:
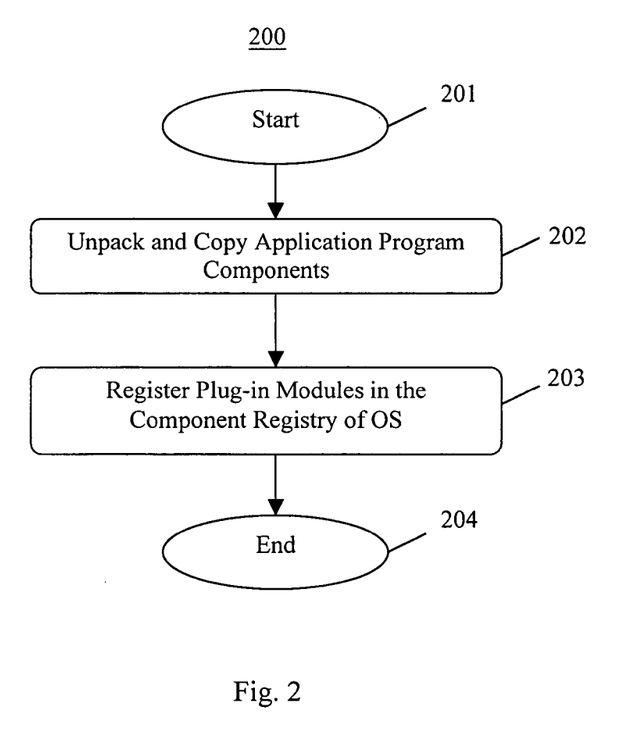
FIG. 2 shows a flowchart of an exemplary embodiment of the application program installation process in accordance with the principles of the present invention.

FIG. 2 shows a flowchart of an exemplary embodiment of the application program installation process in accordance with the principles of the present invention;

As mentioned, each of the plug in modules are compiled as an runtime accessible object, e.g., a WINDOWS™ Dynamic Link Library (DLL), particularly as a component object module (COM) object, or a system object model (SOM) promulgated by the IBM Corporation of Armonk, N.Y., U.S.A., or the like.

The application program installation process 200 begins in step 201, e.g., when a user causes an installer program to be executed on the computer. In step 202, the installer program unpacks and copies the necessary program components as it is known to those familiar with program installers. Then, in step 203, an entry in the operating system registry 102 for each of the plug-in modules. In a preferred embodiment of the present invention, the registration of the plug-in modules comprise adding a COM category entry in the registry, e.g., COM category: <Legacy Data List Plug-in Modules>, and listing each of the plug-in modules 105 as a COM object with a unique identifier under that COM category.

Figure 3:
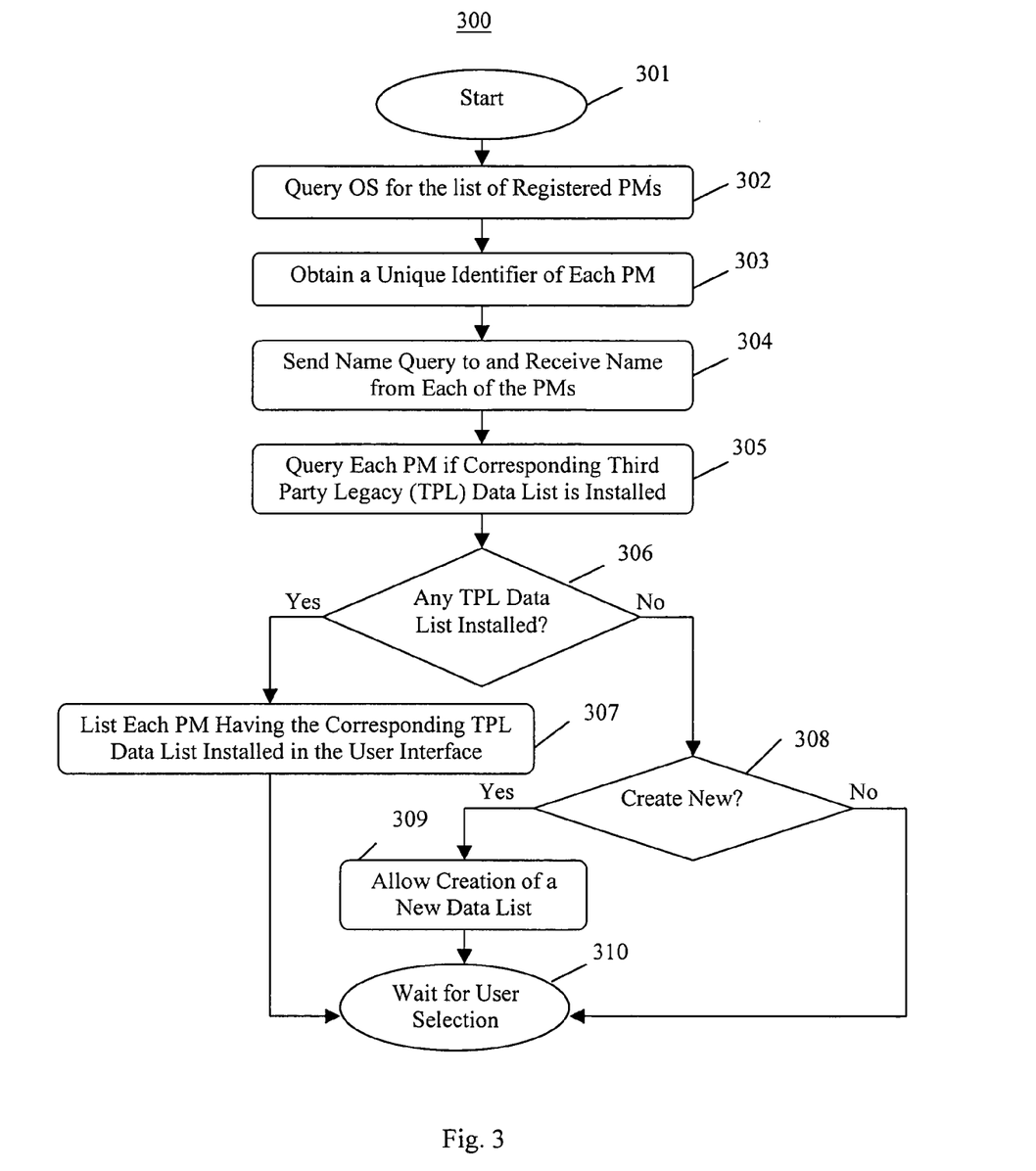
FIG. 3 shows a flowchart of an exemplary embodiment of the plug-in modules discovery process in accordance with the principles of the present invention.

Referring now to FIG. 3, an exemplary embodiment of the plug-in modules discovery process in accordance with the principles of the present invention will be described.

Upon installation and/or start of the application program, the application program in step 301, the application program sends a standard Windows function call, e.g., a COM category call, to query the operating system for the list of plug-in modules under the particular COM category, e.g., the <Legacy Data List Plug-in Modules> COM category, in step 302.

In step 303, the operating system 101 returns the unique identifiers of the plug-in modules registered in the registry 102. The application program 103 at this point knows how many plug-in modules are installed on the computer. In step 304, the application program, using the unique identifiers, sends a name request function call to each of the plug-in modules, and receives the name of the data list from each of the plug-in modules. The application program 103, then sends an availability check function call to each of the plug-in modules in step 305. The application program 103 makes a determination, in step 306, whether any of the plug-in modules has returned with a response that indicates the corresponding data list is installed on the computer. If no plug-in module indicates that the data list it supports is installed on the computer, the application program 103 may ask the user of the application program whether the user wishes to create a new data list in step 308, and if the user so wishes, may provide a user interface screen (not shown) to allow the user to manually enter new data to create a new data list in step 309. The application program 103 then waits for a user action in step 310.

If, on the other hand, it is determined (in step 306) that one or more data list is installed on the computer, the application program 103 causes the names of all data lists that are installed on the computer to be displayed to the user through the user interface 104 to allow the user to select a desired data list from the listed data lists.

As can be appreciated from the above description, once a plug-in module is registered with the operating system, the application program may discover the plug-in module and utilize the same without any modification to the application program 103.

Figure 4:
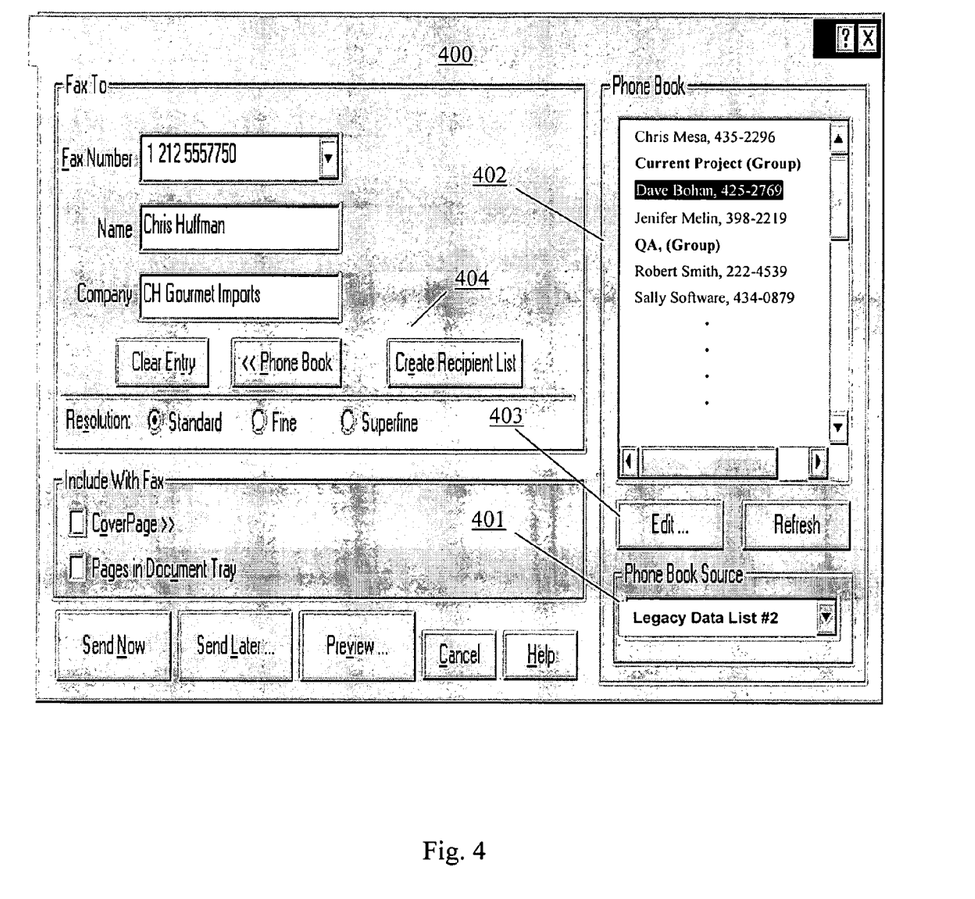
FIG. 4 shows an illustrative exemplary embodiment of the user interface for the application program in accordance with the principles of the present invention.

FIG. 4 shows an illustrative exemplary embodiment of the user interface for the application program 103, e.g., as implemented as a facsimile software, in accordance with the principles of the present invention. The facsimile software user interface 400 comprises, in addition to the various input windows and selection buttons to carry out the functionality of the facsimile software, a drop down selection box 401, which lists the legacy data lists, e.g., in this example phone books from various legacy facsimile software, installed on the computer as identified by the application program according to the process described above.

In FIG. 4, it is shown that the user has selected, e.g., the legacy data list #2. The data set of the legacy data list #2 appears in the display window 402. The user is also allowed to edit the data set of the selected data list by selecting the "Edit" selection button 403, or to create a recipient list by selecting the "Create Recipient List" selection button 404. When the user selects the "Edit" selection button 403, in an embodiment of the present invention, the plug-in module 105 of the selected legacy data list 106 causes an edit user interface of the legacy data list 106 to displayed to the user, and allows the user to add, delete, copy and/or modify the data of the legacy data list using a user interface the user may be familiar. In an alternative embodiment, the plug-in module 105 may cause an edit user interface of the application program 103 to be provided to the user.

In a particular embodiment of the present invention, the selected data list is stored as the "default data source", and is automatically selected the next time the application program 103 is run. The user can use the drop down box 402 to choose another source of data.

Figure 5:
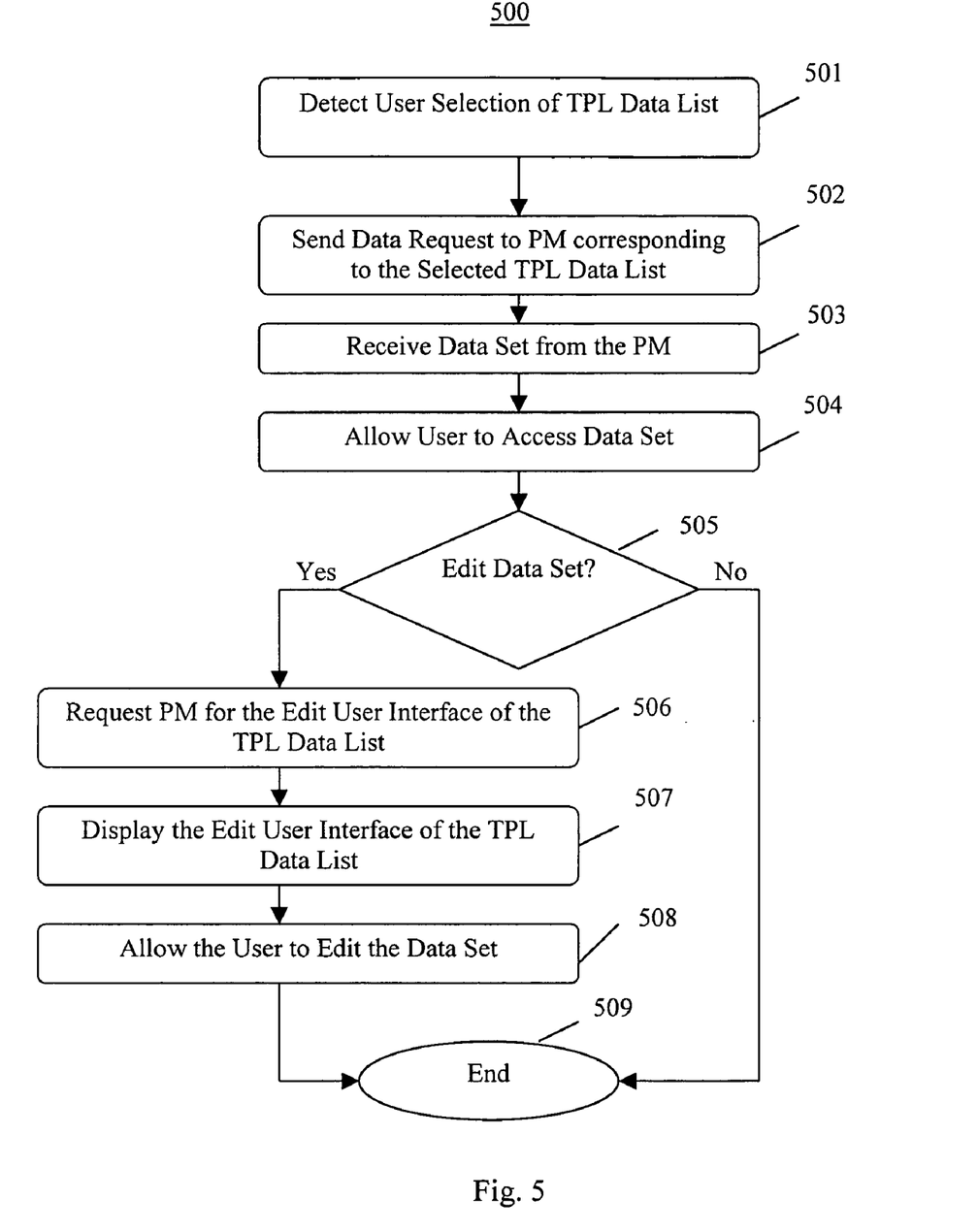
FIG. 5 shows a flowchart of an exemplary embodiment of the user selection and access of the third party legacy data list process in accordance with the principles of the present invention.

Referring to FIG. 5, an exemplary embodiment of the user selection and access of the third party legacy data list process 500 in accordance with the principles of the present invention will now be described. When a user selects one of the data lists, e.g., from the drop down selection box 401, the application program detects the selection in step 501. The application program 103 then sends a data request function call to the plug-in module corresponding to the selected data list in step 502.

The corresponding plug-in module 105 obtains the data set from the selected data list using the TPL data list interface portion 105B, and returns the data set to the application program 103 in step 502. In step 504, the data set is then displayed to the user, e.g., in the display window 402, from which the user can access the data.

If, in step 505, the application program 103 detects that the user wishes to modify any datum in the selected third party legacy data list 105, e.g., when the "Edit" selection button 403 is selected, the application program 103 sends an edit request function call to the plug-in module supporting the selected data list in step 506. The plug-in module then causes an edit user interface screen (not shown) to be displayed in step 507, and the user is allowed to add, delete and/or modify any datum from the data set of the selected data list. The edit user interface screen may be either a user interface screen of the application program 103 or a user interface screen of the legacy data list 106. The process then ends in step 509 until another user action is detected in step 501, in which case, the process 500 is repeated.

Figure 6:
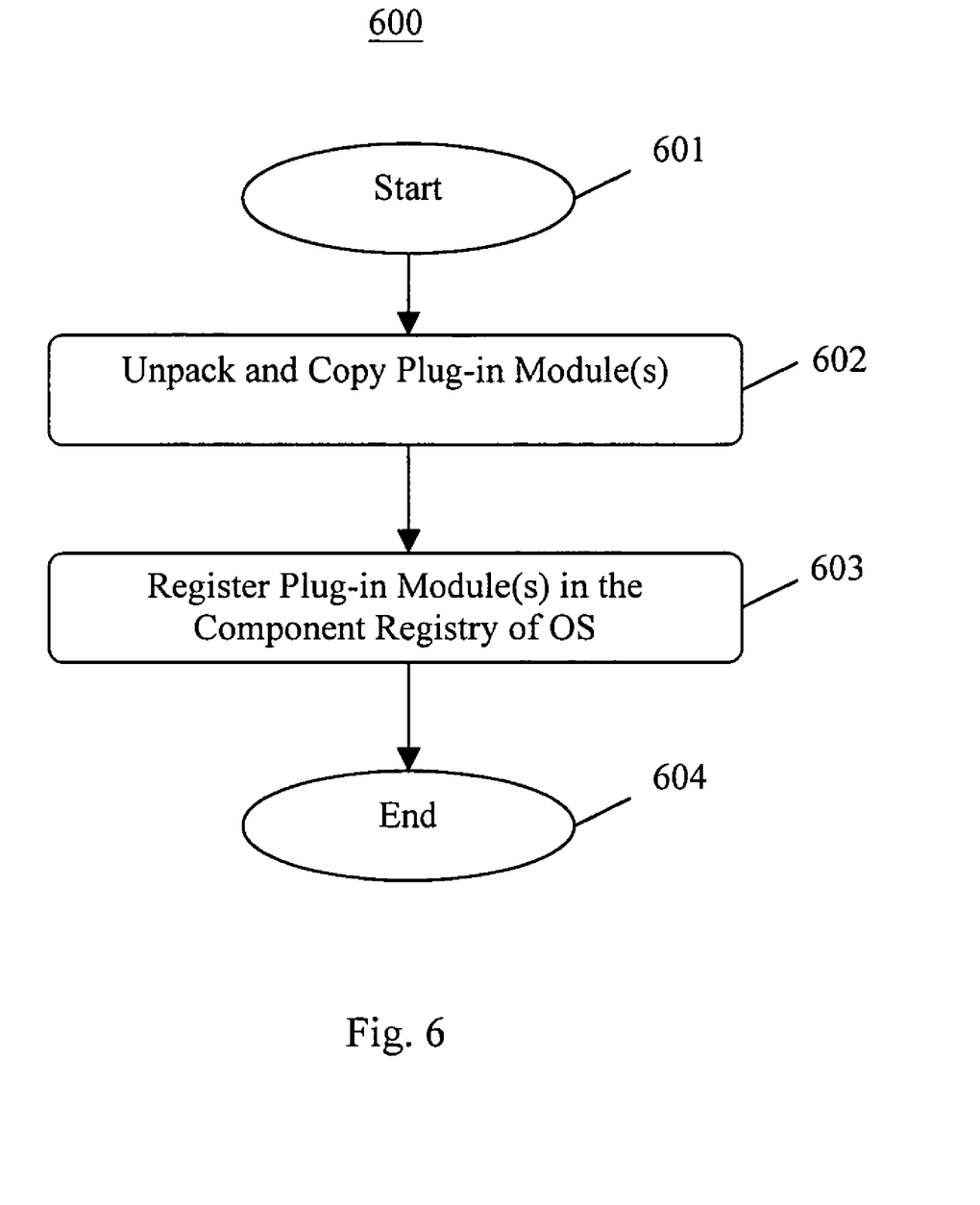
FIG. 6 shows a flowchart of an exemplary embodiment of the application update process in accordance with the principles of the present invention.

FIG. 6 shows a flowchart of an exemplary embodiment of the application update process in accordance with the principles of the present invention. As previously mentioned, even after the application program 103 is installed on a field computer, when a plug-in module for a previously unsupported data list is desired, the plug-in may be developed and delivered to the field, or downloaded from the Internet by the user, and installed on the field computer.

The installer program for the new plug-in module may unpack and copy the new plug-in module(s) to a memory storage of the computer, e.g., a hard disk, in step 602. In step 603, the installer then registers the new plug-in module with the operating system in a similar manner as previously described in connection with FIG. 2. Once the new plug-in module is registered, the application program 103 will automatically discover the new plug-in module the next time the application program is run as described above in FIG. 3.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method of providing an access to one or more third party legacy data list to a user of an application program of a computer system, comprising:

querying an operating system, by said application program upon start of said application program, whether one or more plug-in module is registered in a registry of an operating system, said one or more plug-in modules being capable of interfacing with corresponding respective ones of said one or more third party legacy data list;

receiving, from said one or more plug-in modules found in said registry, identifications of ones of said one or more third party legacy data list corresponding to said found one or more plug-in modules; and providing a list of said identifications to said user through a user interface of said application program.

2. The method of providing an access to one or more third party legacy data list in accordance with claim 1, further comprising:

adding to said computer system one or more additional plug-in module capable of interfacing with one or more additional third party legacy data list; and registering said one or more additional plug-in modules in said registry of said operating system, said application program being configured to find said one or more additional plug-in modules when said application program is started after said addition of said one or more additional plug-in modules.

3. The method of providing an access to one or more third party legacy data list in accordance with claim 1, further comprising:

allowing said user to select a selected one of said one or more third party legacy data list from said list of identifications; and allowing said user to edit at least one datum of said selected one of said one or more third party legacy data list through an edit user interface of said selected one of said one or more third party legacy data list, said application program communicating with said selected one of said one or more third party legacy data list through corresponding one of said one or more plug-in module.

4. The method of providing an access to one or more third party legacy data list in accordance with claim 1, further comprising:

allowing said user to select a selected one of said one or more third party legacy data list from said list of identifications; and allowing said user to access at least one datum of said selected one of said one or more third party legacy data list through said user interface of said application program, said application program communicating with said selected to said one of said one or more third party legacy data list through corresponding one of said one or more plug-in module.

5. The method of providing an access to one or more third party legacy data list in accordance with claim 4, wherein:

said application program comprises a facsimile software; and wherein said one or more third party legacy data list comprise one or more list of names and telephone numbers stored in a format that is not otherwise compatible with the application program using a legacy facsimile software.

6. The method of providing an access to one or more third party legacy data list in accordance with claim 4, wherein; said application program comprises an e-mail software; and wherein said one or more third party legacy data list comprise one or more list of names and e-mail addresses stored in a format that is not otherwise compatible with the application program using a legacy e-mail software.

7. The method of providing an access to one or more third party legacy data list in accordance with claim 4, wherein:

said application program comprises a personal organizer software; and wherein said one or more third party legacy data list comprise one or more contact information and appointment information stored in a format that is not otherwise compatible with the application program using a legacy personal organizer software.

8. A system for providing an access to one or more third party legacy data list to a user of a computer system, comprising:

one or more plug-in modules, each of which being capable of interfacing with an associated one of said one or more third party data list, each of said one or more plug-in modules being registered in a registry of an operating system of said computer system; and an application program having a user interface, said application program upon starting being in communication with said operating system to query said registry to determine registered ones of said one or more plug-in module, said application program further configured to query each of said registered ones of said one or more plug-in modules for names of said one or more third party legacy data list, said application program being configured to provide a list of said names of said one or more third party legacy data list to said user through said user interface.

9. The system for providing an access to one or more third party legacy data list according to claim 8, further comprising:

an installer software configured to copy said one or more plug-in module to said computer system, said installer software further configured to registering said one or more copied plug-in modules in said registry of said operating system.

10. The system for providing an access to one or more third party legacy data list according to claim 8, wherein:

said user interface is configured to allow said user to select a selected one of said one or more third party legacy data list.

11. The system for providing an access to one or more third party legacy data list according to claim 10, wherein:

said application program comprises a facsimile software; and wherein said one or more third party legacy data list comprise one or more list of names and telephone numbers stored in a format that is not otherwise compatible with the application program using a legacy facsimile software.

12. The system for providing an access to one or more third party legacy data list according to claim 10, wherein:

said application program comprises an e-mail software; and wherein said one or more third party legacy data list comprise one or more list of names and e-mail addresses stored in a format that is not otherwise compatible with the application program using a legacy e-mail software.

13. The system for providing an access to one or more third party legacy data list according to claim 10, wherein:

said application program comprises a personal organizer software; and wherein said one or more third party legacy data list comprise one or more contact information and appointment information stored in a format that is not otherwise compatible with the application program using a legacy personal organizer software.

14. A computer readable storage medium on which is embedded one or more computer programs, said one or more computer programs implementing a method of providing an access to one or more third party legacy data list to a user of an application program of a computer system, said one or more computer programs comprising a set of instructions for:
- querying an operating system, by said application program upon start of said application program, whether one or more plug-in module is registered in a registry of an operating system, said one or more plug-in modules being capable of interfacing with corresponding respective ones of said one or more third party legacy data list;
- receiving, from said one or more plug-in modules found in said registry, identifications of ones of said one or more third party legacy data list corresponding to said found one or more plug-in modules; and
- providing a list of said identifications to said user through a user interface of said application program.

15. The computer readable storage medium in according to claim 14, wherein said one or more computer programs further comprising a set of instructions for:
- adding to said computer system one or more additional plug-in module capable of interfacing with one or more additional third party legacy data list; and
- registering said one or more additional plug-in modules in said registry of said operating system, said application program being configured to find said one or more additional plug-in modules when said application program is started after said addition of said one or more additional plug-in modules.

16. The computer readable storage medium in according to claim 14, wherein said one or more computer program further comprising a set of instructions for:
- allowing said user to select a selected one of said one or more third party legacy data list from said list of identifications; and
- allowing said user to edit at least one datum of said selected one of said one or more third party legacy data list through an edit user interface of said selected one of said one or more third party legacy data list, said application program communicating with said selected one of said one or more third party legacy data list through corresponding one of said one or more plug-in module.

17. The computer readable storage medium in according to claim 14, wherein said one or more computer program further comprising a set of instructions for:
- allowing said user to select a selected one of said one or more third party legacy data list from said list of identifications; and
- allowing said user to access at least one datum of said selected one of said one or more third party legacy data list through said user interface of said application program, said application program communicating with said selected to said one of said one or more third party legacy data list through corresponding one of said one or more plug-in module.

18. The computer readable storage medium in according to claim 17, wherein:
- said application program comprises a facsimile software; and
- wherein said one or more third party legacy data list comprise one or more list of names and telephone numbers stored in a format that is not otherwise compatible with the application program using a legacy facsimile software.

19. The computer readable storage medium in according to claim 17, wherein;
- said application program comprises an e-mail software; and
- wherein said one or more third party legacy data list comprise one or more list of names and e-mail addresses stored in a format that is not otherwise compatible with the application program using a legacy e-mail software.

20. The computer readable storage medium in according to claim 17, wherein:
- said application program comprises a personal organizer software; and
- wherein said one or more third party legacy data list comprise one or more contact information and appointment information stored in a format that is not otherwise compatible with the application program using a legacy personal organizer software.

21. A computer readable medium storing one or more plug-in modules for providing an application with access to an unsupported third party legacy data list, the one or more plug-in modules comprising:
- an application program interface operable for:
  - receiving a request function call from the application program;
  - in response to the request function call, returning an identification of the third party legacy data list;
  - receiving an availability function call from the application program;
  - in response to the availability function call, indicating whether or not the third party legacy data list is available.

22. A computer readable medium storing a plug-in module for providing an application program with access to a third party legacy data list not supported by the application program, the plug-in module comprising:
- an application program interface operable to:
  - receive a request function call from the application program and respond with an identification of the third party legacy data list;
  - receive an availability function call from the application program and respond with an indication of whether or not the third party legacy data list is available; and
  - receive a data function call from the application program; and
- a data list interface operable, in response to the data function call, to interface with and access the third party legacy data list.

23. The medium of claim 22, wherein:
- the data list interface is operable to obtain a data set from the third party legacy data list; and
- the application program interface is operable to respond to the data function call by supplying the data set to the application program.

24. The medium of claim 22, wherein:
- the data list interface is operable to obtain a data set from the third party legacy data list; and
- the application program interface is operable to respond to the data function call by providing the application program with information required to present a user interface for adding datum to, modifying datum within, and deleting datum from the data set.

* * * * *

UNITED STATES PATENT AND TRADEMARK OFFICE
CERTIFICATE OF CORRECTION

PATENT NO. : 6,996,816 B1
APPLICATION NO. : 09/676078
DATED : February 7, 2006
INVENTOR(S) : David Bohan Page 1 of 1

It is certified that error appears in the above-identified patent and that said Letters Patent is hereby corrected as shown below:

In column 3, line 39, delete "date" and insert -- data --, therefor.

In column 7, line 65, in Claim 6, delete "wherein;" and insert -- wherein: --, therefor.

Signed and Sealed this

Second Day of June, 2009

JOHN DOLL
*Acting Director of the United States Patent and Trademark Office*